United States Patent [19]

Yamamoto

[11] Patent Number: 4,522,282

[45] Date of Patent: Jun. 11, 1985

[54] EXHAUST SYSTEM FOR MOTORCYCLE

[75] Inventor: Hiroshi Yamamoto, Shizuoka, Japan

[73] Assignee: Yamaha Hatsudoki Kabushiki Kaisha, Japan

[21] Appl. No.: 423,559

[22] Filed: Sep. 27, 1982

[51] Int. Cl.³ .......................... C60K 13/04; F01N 7/08
[52] U.S. Cl. ...................................... 180/219; 60/323;
 180/296; 285/368
[58] Field of Search ............... 180/219, 225, 227, 296,
 180/238; 60/605, 323; 285/374, 368

[56] References Cited

U.S. PATENT DOCUMENTS

| 815,581 | 3/1906 | Dean | 285/368 X |
|---|---|---|---|
| 1,609,159 | 11/1926 | Dawson | 285/368 X |
| 3,798,903 | 3/1974 | Mitchell et al. | 60/323 X |
| 4,197,704 | 4/1980 | Date et al. | 60/323 X |
| 4,327,811 | 5/1982 | Isaka | 180/219 |
| 4,422,519 | 12/1983 | Nomura et al. | 180/296 X |

*Primary Examiner*—Joseph F. Peters, Jr.
*Assistant Examiner*—Mitchell J. Hill
*Attorney, Agent, or Firm*—Ernest A. Beutler

[57] ABSTRACT

An exhaust system for a motorcycle having a V type engine with forwardly and rearwardly facing banks of cylinders. The exhaust system includes relatively short exhaust pipes that are affixed to the rear bank of cylinders and connecting pipes that are detachably connected to these relatively short pipes and which extend to an exhaust device that extends tranversely across the motorcycle and beneath the engine.

15 Claims, 6 Drawing Figures

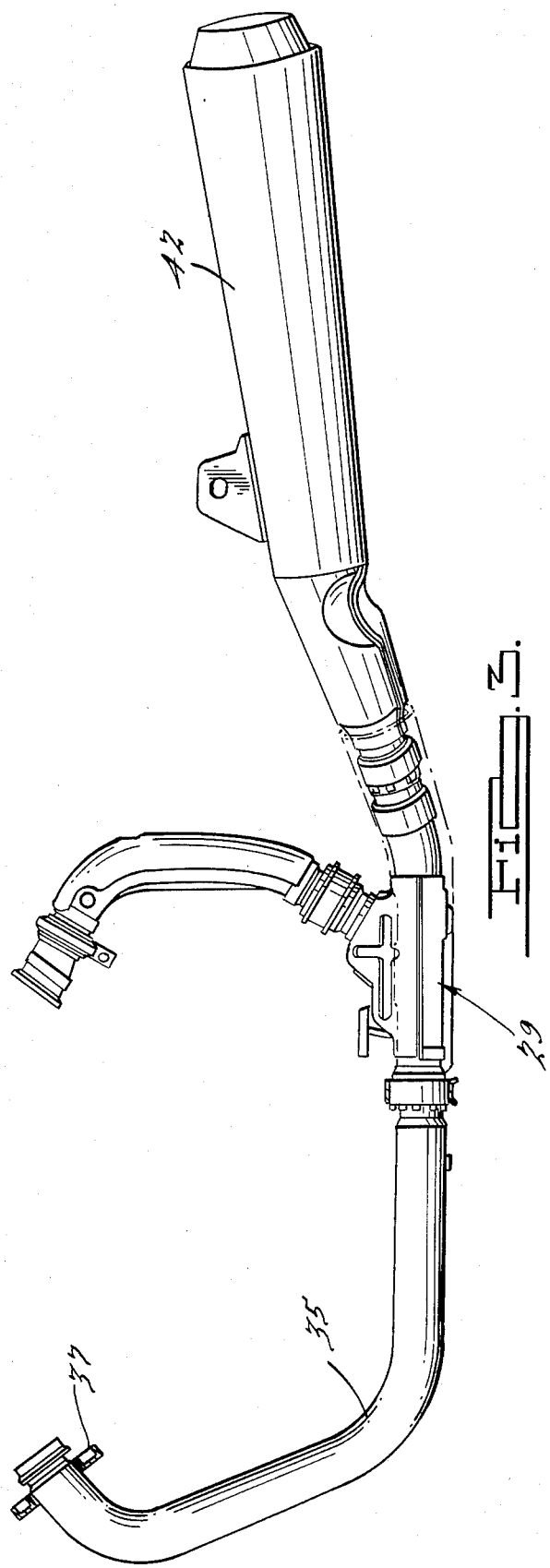

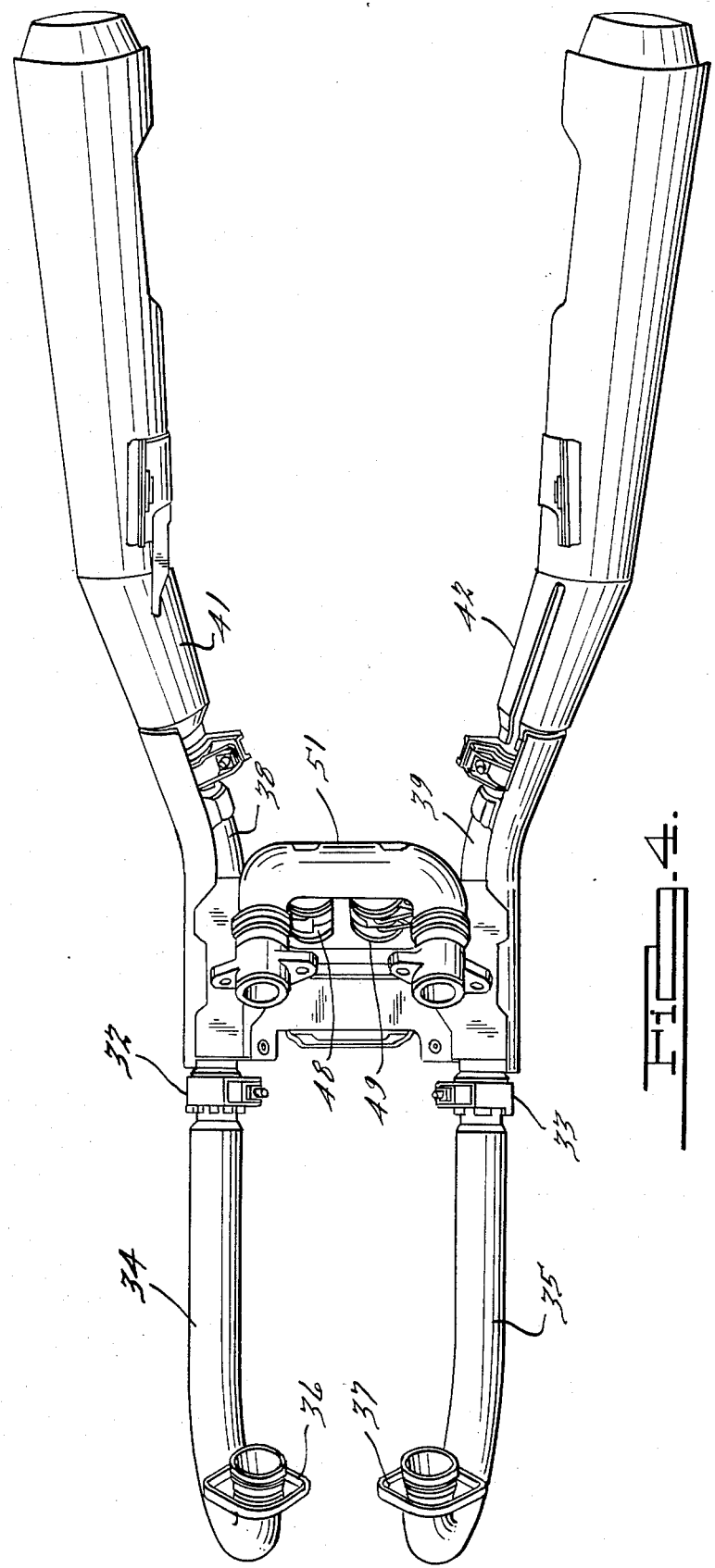

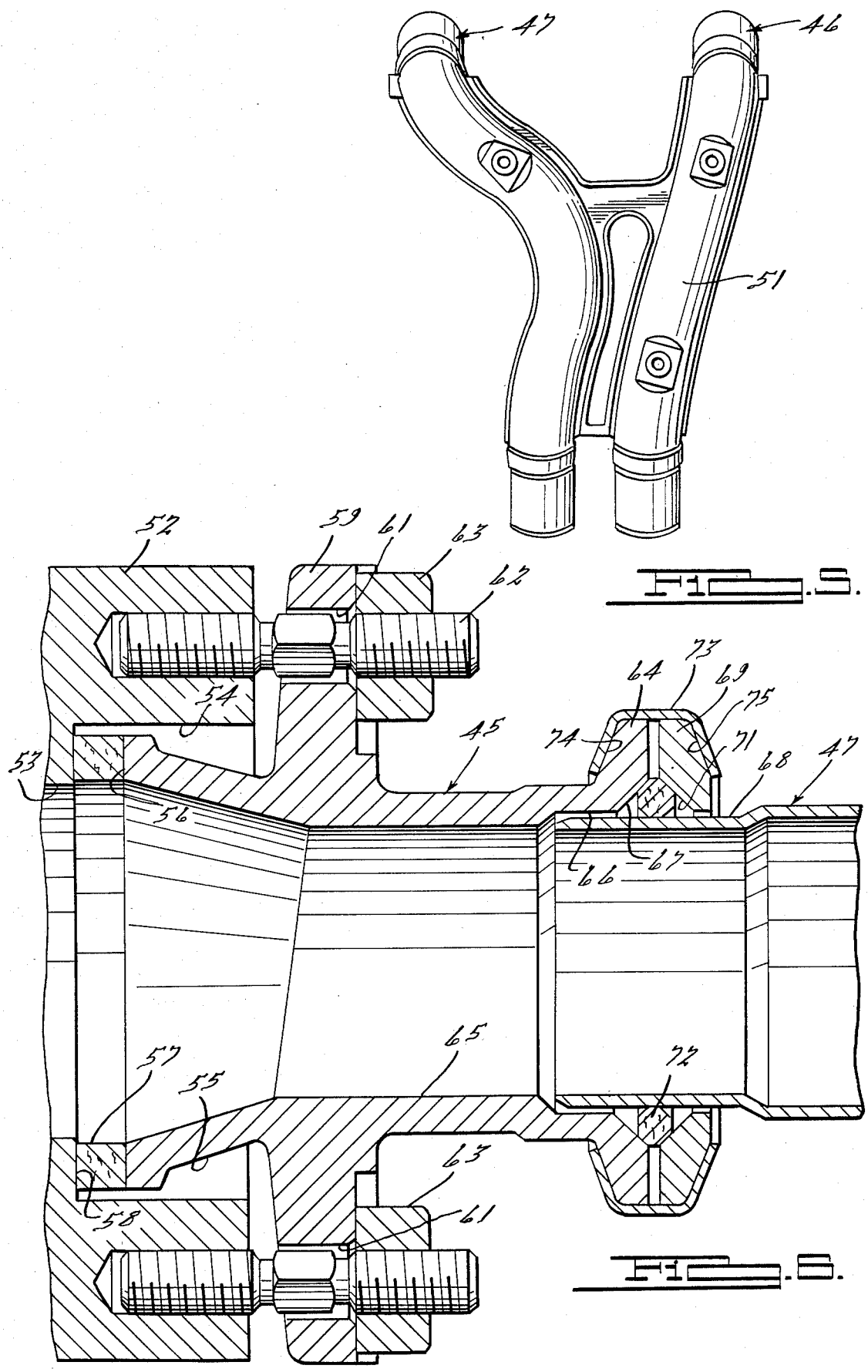

EXHAUST SYSTEM FOR MOTORCYCLE

BACKGROUND OF THE INVENTION

This invention relates to an exhaust system for motorcycles and more particularly to an improved exhaust system that facilitates servicing of the motorcycle and its exhaust system.

When using a V type engine in a motorcycle, a more compact arrangement may be achieved if the crankshaft of the engine is positioned transversely to the longitudinal axis of the motorcycle with the banks of cylinders facing forwardly and rearwardly, respectively. With such an arrangement, compactness may be achieved but servicing of the motorcycle and particularly its exhaust system can be difficult. These problems are particularly acute if the engine has more than two cylinders so that each bank of cylinders has two or more cylinders. It is the normal practice with such arrangements to have the exhaust ports of the front bank of cylinders facing forwardly and those of the rear bank of cylinders facing rearwardly. It is desirable to feed all of the exhaust pipes into a single exhaust device such as an expansion chamber or muffler prior to discharge to the atmosphere. This can be conveniently done if the exhaust device is positioned transversely of the motorcycle beneath the engine with all of the exhaust pipes leading to it. U.S. Pat. No. 4,327,811, assigned to the Assignee of this application, illustrates such an exhaust arrangement that permits a compact construction and yet locates all of the components and particularly those of the exhaust system where they will not interfere with the rider. With the arrangement shown in that patent, both the front and rear exhaust pipes are unitary assemblies that extend from a flange that sealingly engages the exhaust port of the engine to an outlet that communicates with the muffler or exhaust device. Although this arrangement is particularly useful and compact, in some instances servicing may be difficult inasmuch as it may be necessary to remove the entire exhaust system to service individual exhaust pipes.

It is, therefore, a principal object of this invention to provide an improved, compact exhaust system for a motorcycle that facilitates servicing of the exhaust system components.

It is another object of this invention to provide an improved highly serviceable exhaust system for a motorcycle embodying a V type engine.

SUMMARY OF THE INVENTION

The first feature of this invention is adapted to be embodied in an exhaust system for a motorcycle or the like comprising an engine having an exhaust port, a frame assembly having an element juxtaposed to said exhaust port, and an exhaust device supported at a location spaced from said exhaust port and having an exhaust gas inlet. In accordance with this feature of the invention, an exhaust pipe is affixed to the engine in communication with the exhaust port. The exhaust pipe is relatively short in length and a separate, removable connecting pipe extends from the outlet end of said exhaust pipe to the muffler exhaust gas inlet of the exhaust device.

Another feature of the invention is adapted to be embodied in a motorcycle of the type having a first frame portion mounting an engine and a second frame portion mounting a rear wheel. The portions are pivotally connected by horizontally disposed pivot means. The second frame portion comprises a pair of laterally spaced apart arms and the engine comprises two banks of cylinders, one disposed forwardly of the other. An exhaust system is provided that comprises a front bank exhaust pipe extending from the front bank downwardly and rearwardly to an exhaust device that is positioned at an elevation beneath that of the engine. In accordance with this feature of the invention, a relatively short exhaust pipe is affixed in communication with the exhaust port of the rear bank and a separate connecting pipe extends from the short exhaust pipe to the exhaust device.

BRIEF DESCRIPTION OF THE DRAWINGS

FIG. 3 is a side elevational view showing the exhaust system.

FIG. 4 is a top plan view showing the exhaust system.

FIG. 5 is a rear elevational view of the connecting pipe of the exhaust system.

FIG. 6 is an enlarged, cross-sectional view taken generally along a plane passing through one of the exhaust ports of the rear bank of cylinders.

DETAILED DESCRIPTION OF THE PREFERRED EMBODIMENT

Figure 1:
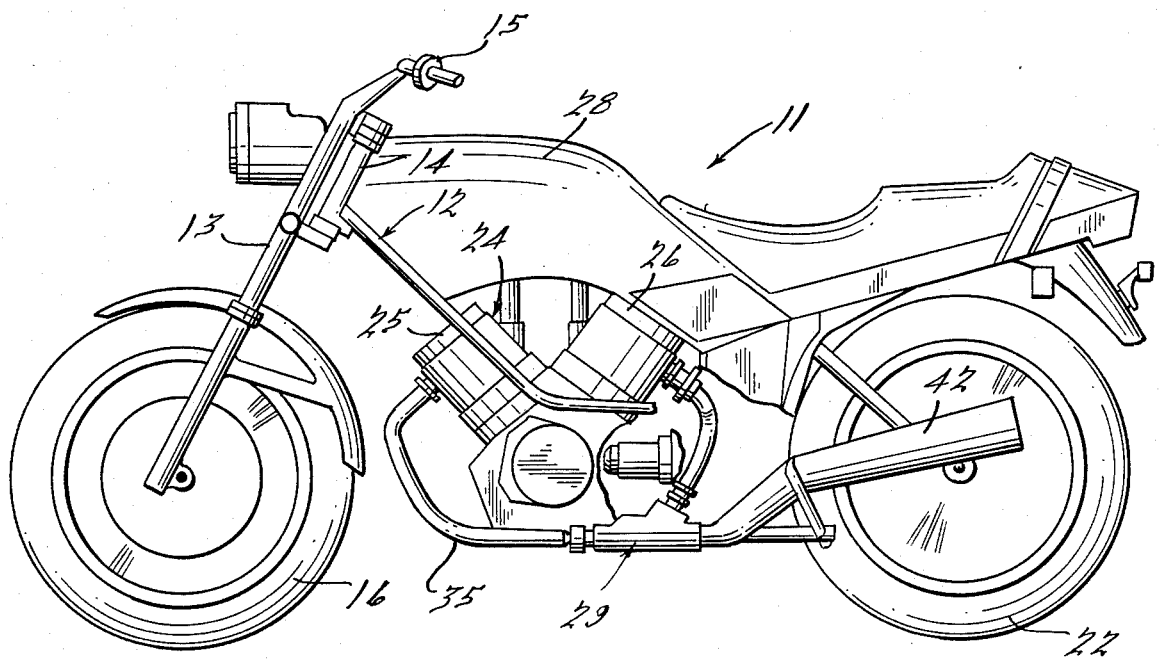
FIG. 1 is a side elevational view of a motorcycle having an exhaust system constructed in accordance with this invention with portions broken away.

Referring first to FIG. 1, a motorcycle constructed in accordance with this invention is identified generally by the reference numeral 11. The motorcycle 11 includes a frame assembly, indicated generally by the reference numeral 12 and which may be of a known type. A front fork 13 is supported by a head pipe 14 of the frame for steering movement and has a handlebar assembly 15 affixed to its upper end. A front wheel 16 is rotatably journaled by the fork 13.

Figure 2:
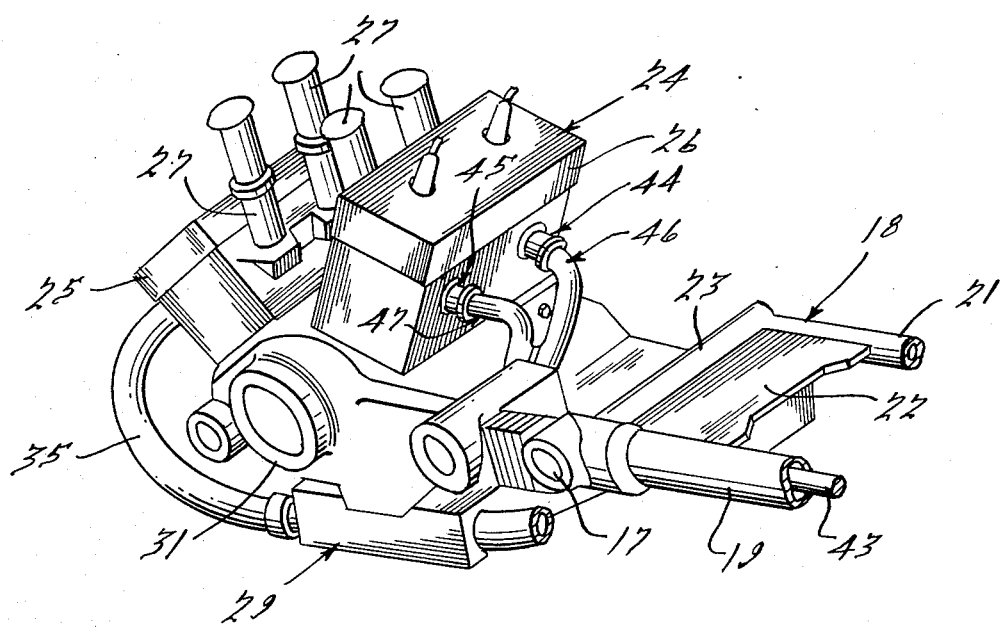
FIG. 2 is a perspective view showing a portion of the motorcycle and specifically the engine exhaust system and the forwardmost portion of the rear suspension.

Referring now additionally to FIG. 2, the frame 12 has a pair of downwardly extending portions that provide a pivot axis 17 for a rear wheel suspension arm assembly, indicated generally by the reference numeral 18. The suspension arm assembly 18 includes a pair of spaced arm parts 19 and 21 that extend rearwardly from the pivot axis 17 and rotatably support the rear wheel 22 in a known manner. The arm portions 19 and 21 are integrally connected at their forward end by means of a gusset plate 22 and tube 23 which forms a portion of the pivotal support for the arm assembly 18.

A V type engine, indicated generally by the reference numeral 24, is supported by the frame 12 in a known manner. Engine 24 is supported with its crankshaft extending transversely to the longitudinal axis of the motorcycle 11. The engine 24 includes a front bank of cylinders 25 and a rear bank of cyliners 26. In the illustrated embodiment, the engine 24 is of the V four type and hence each bank 25, 26 includes two cylinders. The cylinders of the front bank 25 have forwardly facing exhaust ports while those of the rear bank 26 have rearwardly facing exhaust ports.

An induction system is positioned in the area between the banks of cylinders 25, 26 and includes intake pipes and carburetors 27 that extend generally vertically upwardly to an intake device that is positioned in part in the interior of a saddle shaped fuel tank 28 that is supported by the frame 12. The intake device is not illustrated but may take any known form.

Referring now additionally to the remaining figures, the engine exhaust system will be described. The exhaust system includes an exhaust device such as an expansion chamber and/or muffler assembly, indicated generally by the reference numeral 29 which extends transversely across a substantial portion of the width of the motorcycle 11 and which is positioned beneath a combined crankshaft, transmission 31 of the engine 24. The exhaust device 29 has a pair of forwardly facing inlets 32 and 33 that receive the discharge end of forward exhaust pipes 34 and 35. The forward exhaust pipes 34 and 35 have conventional flanges 36, 37, that cooperate with the exhaust ports of the forward cylinder bank 25 for conveying the exhaust gases to the inlets 32, 33 of the exhaust device 29. As may be readily apparent from the drawings, the pipes 34 and 35 extend forwardly initially then downwardly and terminate at the exhaust device 29.

The exhaust device 29 has a pair of outlets 38 and 39 that curve outwardly and to which combined tailpipe and muffler assemblies 41 and 42 are affixed. The muffler and tailpipe assemblies 41 and 42 run along the sides of the rear wheel 22 for discharging the exhaust gases to the atmosphere.

From FIG. 2 it should be readily apparent that the rear suspension and specifically the arm 18 is disposed closely adjacent the rear bank 26 of the engine. This is done to maintain as short as possible a wheel base. In addition, a drive shaft 43 for driving the rear wheel 22 extends through the arm 19. In prior art exhaust systems, exhaust pipes similar to the front exhaust pipes 34 and 35 have also extended into the exhaust device 29 from the rear bank of cylinders. With such arrangements, it has been found necessary to remove the entire exhaust system so as to permit replacement of the rear exhaust pipes. In accordance with this invention, an arrangement is provided wherein the exhaust system associated with the rear bank 26 may be serviced without removal of the complete exhaust system.

The rear exhaust system comprises a pair of relatively short exhaust pipes, indicated generally by the reference numerals 44 and 45, that are connected in a manner to be described to the cylinder head of the bank 26 in communication with the respective exhaust ports therein. Connected to these exhaust pipes 44 and 45 by means of a connection that minimizes the amount of telescoping between the two pipes are a pair of connecting pipes 46 and 47. The discharge end of the connecting pipes 46 and 47 have a normal connection with inlets 48 and 48 to the exhaust device 29 which inlets are positioned centrally and to the rear of the device 29. A heat shield and baffle plate 51 is affixed to the connecting pipes 46 and 47.

The connection between the exhaust pipes 44 and 45 to the cylinder head exhaust ports and to the connecting pipes 46, 47, respectively, will now be described by particular reference to FIG. 6. Since the connection between each of the exhaust pipes and connecting pipes is the same, only that between the pipes 45 and 47 has been illustrated in detail in this figure.

The connection between the exhaust pipe 45 and the cylinder head of the bank 26, which is shown partially and is identified by the reference numeral 52 is substantially the same as the connection between the exhaust pipes 34 and 35 with the cylinder head of the bank 25. The cylinder head 52 has its exhaust port 53 extending through its outer, rearwardly facing side surface. A counterbore 54 is formed at the discharge mouth of the exhaust port 53. The exhaust pipe 45 has a generally tapered section 55 that has a forwardly facing shoulder 56 that engages a gasket or seal 57 and presses it into sealing engagement with a shoulder 58 formed at the base of the counterbore 54. Adjacent the tapered section 55, the exhaust pipe 45 is formed with a flange 59 having a pair of bores 61 that pass studs 62 that are threaded into tapped holes in the cylinder head 52 on opposite sides of the counterbore 54. Nuts 63 are threaded onto the outer ends of the studs 61 so as to hold the portion 55 in sealing engagement with the gasket 57 and so as to maintain the gasket 57 in engagement with the cylinder head shoulder 58.

The exhaust pipe 45 is relatively short and terminates in a continuous flange 64 at its discharge end. An exhaust passage 65 extends through the exhaust pipe 45 and a counterbore 66 is formed at its rearward or discharge end. A beveled gasket seating surface 67 is formed at the outer end of the counterbore 66.

The connecting pipe 47 has a reduced diameter cylindrical shaped end 68 that extends partially into the counterbore 66 past the beveled end 67. A clamping ring 69 encircles the end 68 and has a beveled surface 71 that faces the exhaust pipe beveled surface 67.

An annular gasket 72 of octagonal cross-sectional configuration is received between the flange 64 and the clamping ring 69 and engages the connecting pipe section 68. A split clamping band 73 has a pair of inclined surfaces 74 and 75 that engage corresponding surfaces formed on the flange 64 and clamping ring 69. Thus, when the band 73 is tightened, the surfaces 71 and 67 will be urged into engagement with the gasket 72 and the gasket 72 will also be urged into sealing engagement with the connecting pipe portion 68. Thus, a highly effective seal will be provided between the exhaust pipe 45 and the connecting pipe 47 that will eliminate any leakage.

The discharge ends of the connecting pipes 46 and 47 are connected to the exhaust device inlets 48 and 49 in any suitable manner.

The baffle and heat shield 51 is affixed in a known manner to the connecting pipes 46 and 47 and preferably to bosses formed therein so that the baffle and heat shield 51 will be spaced slightly from the main portion of the connecting pipes 46 and 47.

From the aforedescribed construction, it should be readily apparent that the connecting pipes 46 and 47 may be easily removed and replaced without necessitating removal of the complete exhaust system. That is, by releasing of the clamping band 73, the connection between the inlet end of the connecting pipe 47 and the outlet end of the exhaust pipe 45 may be removed and the connecting pipes 46 and 47 replaced. In a like manner, once the pipes 46 and 47 are removed, the exhaust pipes 44 and 45 may be removed and the gaskets 57 replaced.

Although one embodiment of the invention has been described in detail, it is believed to be readily apparent that various changes and modifications may be made without departing from the spirit and scope of the invention, as defined by the appended claims.

I claim:

1. In an exhaust system for a motorcycle or the like comprising an engine having an exhaust port, a frame assembly having an element juxtaposed to said exhaust port, and an exhaust device supported at a location spaced from said exhaust port and having an exhaust gas inlet, the improvement comprising an exhaust pipe affixed to said engine in communication with said exhaust port, said exhaust pipe being relatively short in length, and a separately removable connecting pipe extending from the outlet end of said exhaust pipe to said exhaust device exhaust gas inlet.

2. In an exhaust system as set forth in claim 1 wherein the connection at one end of the connecting pipe is a removable connection.

3. In an exhaust system as set forth in claim 2 wherein the removable connection comprises a counterbore in one of the connected members, the other of the connected members having a reduced diameter portion extending into the counterbore and a separately removable gasket clampingly engaged between the outer portion of the reduced diameter section and the other member.

4. In an exhaust system as set forth in claim 3 wherein the removable connection is between the outlet end of the exhaust pipe and the inlet end of the connecting pipe.

5. In an exhaust system as set forth in claim 1 wherein there are a plurality of exhaust ports and exhaust pipes and removable connecting pipes extend from each of the exhaust ports to the exhaust device.

6. In an exhaust system as set forth in claim 5 further including a heat shield affixed to the connecting pipes.

7. In an exhaust system as set forth in claim 1 wherein the juxtaposed portion of the frame assembly comprises means providing a pivotal connection for a supporting arm of the rear wheel of the motorcycle.

8. In an exhaust system as set forth in claim 7 wherein the engine has a plurality of exhaust ports and there are a plurality of exhaust pipes and connecting pipes each extending from a respective one of the exhaust ports to an exhaust device extending transversely across the motorcycle and positioned at a lower level than the engine.

9. In an exhaust system as set forth in claim 8 wherein the connection at one end of the connecting pipe is a removable connection.

10. In an exhaust system as set forth in claim 9 wherein the removable connection comprises a counterbore in one of the connected members, the other of the connected members having a reduced diameter portion extending into the counterbore and a separately removable gasket clampingly engaged between the outer portion of the reduced diameter section and the other member.

11. In an exhaust system as set forth in claim 10 wherein the removable connection is between the outlet end of the exhaust pipe and the inlet end of the connecting pipe.

12. In combination with a motorcycle of the type having a frame portion mounting an engine and a rear frame portion mounting a rear wheel, said portions being pivotally connected by horizontally disposed pivot means, said rear frame portion comprising a pair of laterally spaced apart arms, said engine comprising two banks of cylinders, one disposed forwardly of the other, an exhaust system comprising a front bank exhaust pipe extending from the front bank downwardly and rearwardly, an exhaust device mounted at an elevation beneath that of said engine, a tailpipe discharging rearwardly from said exhaust device, the improvement comprising a relatively short exhaust pipe affixed to the rear bank of the engine in communication with its exhaust port and a separately removable connecting pipe extending from the outlet end of said exhaust pipe to an inlet of said exhaust device.

13. The combination as set forth in claim 12 wherein the connection at one end of the connecting pipe is a removable connection.

14. The combination as set forth in claim 13 wherein the removable connection comprises a counterbore in one of the connected members, the other of the connected members having a reduced diameter portion extending into the counterbore and a separately removable gasket clampingly engaged between the outer portion of the reduced diameter section and the other member.

15. The combination as set forth in claim 14 wherein the removable connection is between the outlet end of the exhaust pipe and the inlet end of the connecting pipe.

* * * * *